United States Patent [19]

Vaillette

[11] 3,945,694
[45] Mar. 23, 1976

[54] TOOLHEAD

[75] Inventor: Bernard D. Vaillette, Leominster, Mass.

[73] Assignee: Cincinnati Milacron-Heald Corporation, Worcester, Mass.

[22] Filed: Nov. 4, 1974

[21] Appl. No.: 520,410

[52] U.S. Cl. ......... 308/184 A; 51/134.5 R; 51/168; 308/183
[51] Int. Cl.² ......................................... B24B 41/00
[58] Field of Search ......... 308/36, 58, 60, 149, 150, 308/151, 184 R, 184 A, 189 R, 189 A, 207 R, 184, 183; 51/134.5 R, 166.7, 168; 242/129.5; 57/134, 135

[56] References Cited
UNITED STATES PATENTS

| | | | |
|---|---|---|---|
| 2,221,176 | 11/1940 | Boll | 308/183 |
| 2,523,983 | 9/1950 | Arms | 308/184 R |
| 2,538,229 | 1/1951 | Boden | 308/184 R |
| 2,819,127 | 1/1958 | Grobey | 308/183 |
| 3,348,341 | 10/1967 | Dunn | 51/134.5 |
| 3,385,009 | 5/1968 | Luejers | 51/168 |
| 3,422,578 | 1/1969 | Mossman et al. | 51/168 |
| 3,664,718 | 5/1972 | Uhtenwoldt | 308/189 A |
| 3,813,826 | 6/1974 | Bando | 51/168 |

FOREIGN PATENTS OR APPLICATIONS

| | | | |
|---|---|---|---|
| 883,533 | 11/1952 | Germany | 308/189 |
| 104,039 | 8/1926 | Austria | 308/189 |

Primary Examiner—M. H. Wood, Jr.
Assistant Examiner—Richard A. Bertsch
Attorney, Agent, or Firm—Norman S. Blodgett; Gerry A. Blodgett

[57] ABSTRACT

A toolhead having a spindle mounted in axially spaced bearings wherein one of the bearings is allowed to slide axially during dynamic effects on the bearings or thermal expansion and contraction of the spindle, the axial movement being made possible by the provision of rows of barrel-shaped rollers.

5 Claims, 3 Drawing Figures

TOOLHEAD

BACKGROUND OF THE INVENTION

In the design and manufacture of toolheads such as the wheelhead of a grinding machine, it is desirable that the spindle be very rigidly mounted. At the same time, it is necessary that the spindle rotate freely with a minimum of friction, so that horsepower applied in driving the spindle is absorbed principally by the working operation at the tool itself where it engages the workpiece. A rigid spindle is one in which forces applied to the protruding end of the spindle during the working operation do not result in a large deflection of the spindle and tool. Even more important is the fact that the small amount of unavoidable deflection be the same at all times for the same force applied. For this purpose it is common practice to prestress the bearings, which in most cases are ball bearings. As long as the prestressing remains the same, presumably the amount of deflection of the spindle with a given force will remain the same. However, during the operation of a toolhead the temperature may vary from one time to another depending on a large number of factors such as, the amount of machining work being done, the ambient temperature around the machine and the like. When the temperature changes this results in a thermal expansion or contraction of the spindle and when this happens in the portion of the spindle lying between two axially spaced bearings, the result is to change the prestress in the bearings. In order to overcome this deficiency, it has been suggested that one set of bearings be permitted to slide axially when the length of the spindle between bearings changes. One way of accomplishing this is shown in the U.S. Pat. of Grobey No. 2,819,127. One of the deficiencies of such prior art devices, however, is that in the process of allowing sliding of one of the bearings, the rigidity of the spindle is lost. This means that forces applied to the spindle during the machining operation cause extremely large and undesirable deflections of the spindle. Also, as the spindle speed is increased, the centrifugal force on the balls in the ball bearings increases. Consequently, the contact angle between the balls and the outer race decreases and the contact angle between the balls and inner race increases. This effect geometrically causes the spindle to move forward some distance. The other races of the rear pair of bearings move forward twice that distance; this is another reason why the rear bearings must be free to move axially. These and other difficulties experienced with the prior art devices have been obviated in a novel manner by the present invention.

It is, therefore, an outstanding object of the invention to provide a toolhead whose spindle is mounted in axially spaced bearings under prestress, wherein means is provided to allow the prestress to remain the same despite temperature changes in the spindle without, however, affecting the rigidity of the spindle.

Another object of this invention is the provision of a toolhead having a spindle rotatably mounted therein whose spring-constant remains the same despite changes of temperature.

A further object of the present invention is the provision of a toolhead having an extremely rigid sliding system for one of the bearings.

It is another object of the instant invention to provide a toolhead which is simple in construction and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consist of a toolhead having a housing with a bore extending therethrough and having a spindle rotatably mounted in the bore and extending therefrom with a tool mounted on the extended end. A first anti-friction bearing is mounted at one end of the spindle and the bore, the bearings having an outer race fixed in the bore, an inner race mounted on the spindle, and rolling elements located therebetween. A second anti-friction bearing is mounted at the other end of the spindle between the spindle and the bore, the bearings having an outer race, an inner race, and rolling elements located therebetween. A sleeve is mounted in the bore with the outer race of the second anti-friction bearing fixed in the sleeve, and the corresponding inner race fixed to the spindle. Two axially spaced rows of rolling elements reside between the sleeve and the bore to allow the sliding movement. Each row consists of a plurality of rollers of barrel-shape, the axis of each roller being tangential to a circle concentric to the axis of the spindle.

More specifically, each roller has an outer surface whose generatrices are a segment of a circle having a radius less than the radius of the bore. A retainer is located between the sleeve and the bore to hold the rollers in place and for that purpose is provided with a generally rectangular perforations in which the rollers reside. At least one transverse side of each aperture being curved to closely embrace its roller.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
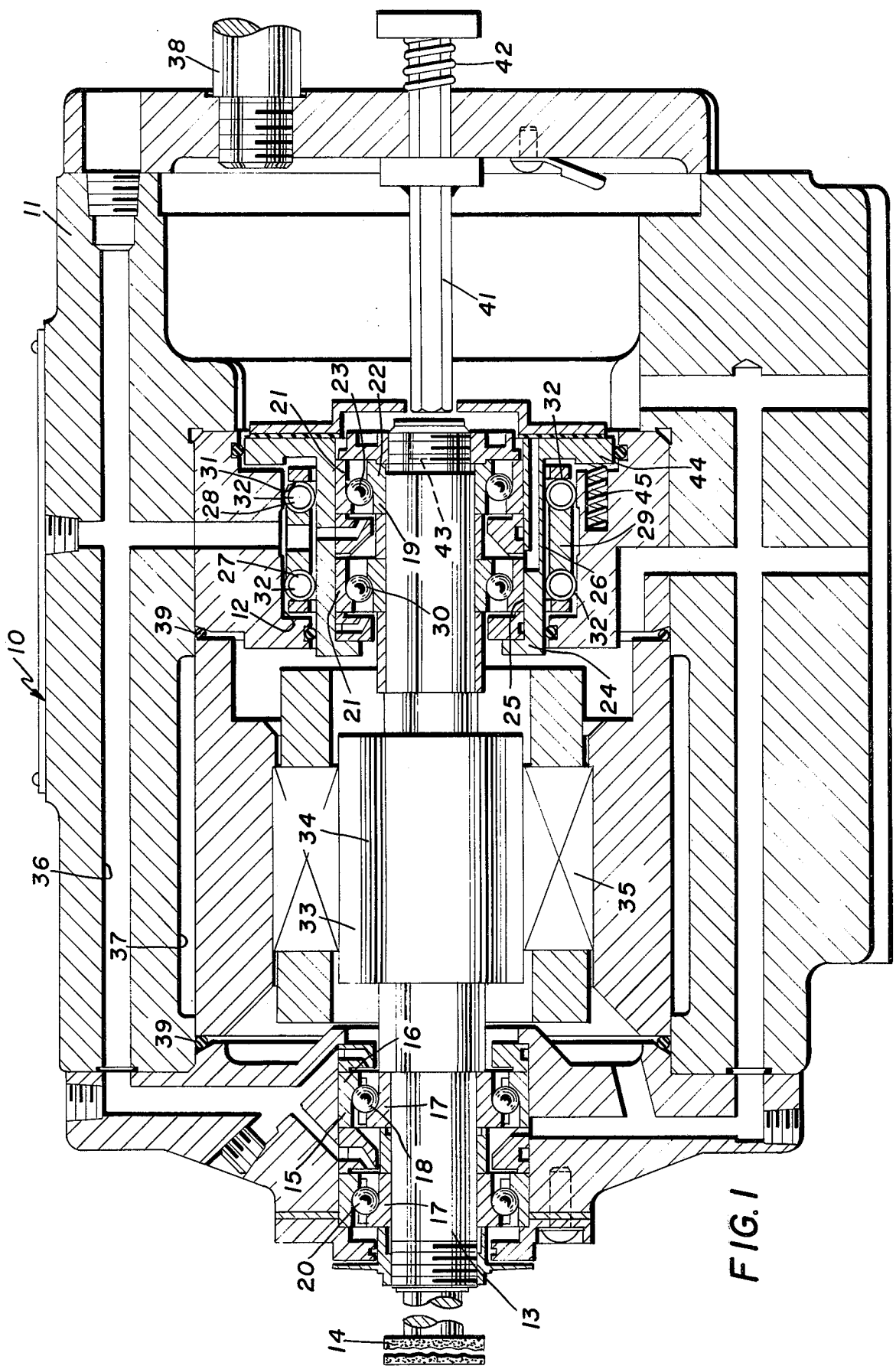
FIG. 1 is a vertical sectional view of a toolhead incorporating the principles of the present invention.

Referring first to FIG. 1, wherein are best shown the general features of the invention, the toolhead indicated generally by the reference numeral 10 is shown as having a housing 11 which is formed with a horizontal bore 12 which extends through the housing. A spindle 13 is rotatably mounted in the bore and extends from one end thereof for carrying a tool such as an abrasive wheel 14. The end of the spindle 13 in the housing adjacent the wheel 14, is carried in a first roller bearing 15, having an outer race 16 which is fixed in the bore 12, an inner race 17 which is fixed to the spindle 13, and rolling elements 18 lying between the races. The other end of the spindle is carried in a roller bearing 19, having an outer race 21, an inner race 22 which is fixed to the spindle 13 and roller elements 23 lie therebetween. As is obvious in the drawings, each of the bearings 15 and 19 is provided with a closely adjacent similar ball bearing 20 and 30, respectively.

A tubular sleeve 24 is located in the housing and the outer race 21 of the second anti-friction bearing 19 is fixed in its inner surface 25, the inner race of the bearing being fixed to the spindle 13. Located between the outer surface 26 of the sleeve 24 and the surface of the bore 12 are two spaced parallel rows 27 and 28 of rolling elements such as rollers 32 which allow the sliding movement between the second anti-friction bearing 19 and the housing. Each of the rollers is generally barrel-shaped with its axis tangential to a circle which is concentric with the spindle. A retainer 29 is located between the outer surface of the sleeve 24 and the bore in order to maintain the rollers in place. The sleeve is provided with a plurality of generally rectangular-shaped perforations 31 in which the rollers reside.

Located in the housing for the purpose of rotating the spindle 13, is a high-frequency motor 33 whose armature 34 is mounted on the center portion of the spindle between the bearings and whose field coils 35 are mounted in the bore in the housing. The housing 12 is provided with a network of passages 36 through which mist lubrication is provided to appropriate parts of the toolhead. Particularly, the mist lubrication is provided to the first anti-friction bearing 17, the second anti-friction bearing 19, and the rollers 32. The housing 11 is provided with a heat-absorbing recess 37 to which cooling water is admitted. Seals 39 are provided at the ends of the recess to keep the cooling water away from the motor. A wrench 41 is slidably mounted on the rear cap of the toolhead and is biased to an outward position by a coil spring 42. The wrench has a hexagonal cross-section and fits snugly in a recess formed in the spindle 13. The wrench is used to hold the spindle from rotating when it is necessary to apply tools to the other end of the spindle in mounting the abrasive wheel 14, etc. Note that the sleeve 24 is provided with a radially outwardly extending flange 44 and coil springs 45 are pocketed in the rear end bell and pressed against the flange to urge the sleeve to the right in FIG. 1, thus prestressing the anti-friction ball bearings.

Figure 2:
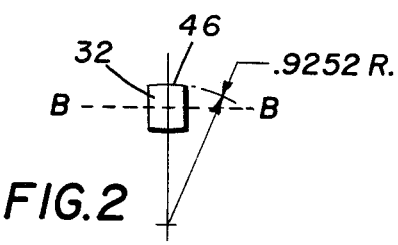
FIG. 2 is a front elevational view of a roller.

Referring next to FIG. 2, it can be seen that each roller 32 is generally barrel-shaped. It is provided with an outer curved surface 46 which is a surface generated by rotating the arc of a circle about the axis B—B of the roller. The ends are cut off at right angles to the axis. Note that the radius of the generatrix of the surface 46 is selected to be less than the radius of the bore 12 in which the rollers are contained. In a specific embodiment of the invention, the radius of the generatrix is 0.9252 inches, while the radius of the bore 12 against which it engages, is 1.275 inches.

Figure 3:
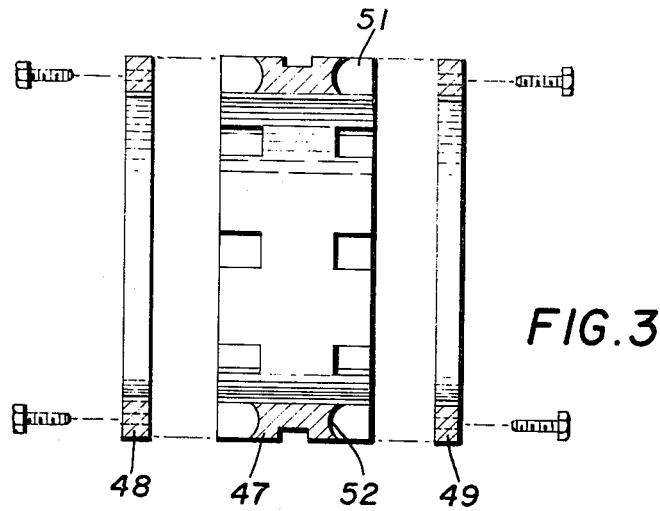
FIG. 3 is an exploded vertical sectional view of a retainer used in the toolhead.

Referring next to FIG. 3, the manner in which the retainer 29 is constructed is shown. The central tubular portion 47 is provided. To this tubular portion are bolted rings 48 and 49. The ends of the central portion 47 are provided with a series of notches 51. The notches are formed by milling them with a 7/8 diameter Woodruff key cutter, thus producing parallel sides and a bottom 52 which is curved for containment of the rollers. The rollers are placed in the notches and then the rings 48 and 49 are bolted in place so that the rollers are trapped in the cavities 31. The radius of the rollers is substantially less than the radius of the surface 42, so that the roller engages the curves surface 52 with point contact.

The operation of the invention will now be readily understood in view of the above description. When the motor 33 is energized the spindle 13 is rotated carrying the tool 14 with it and work is performed by the tool. Lubrication is introduced into the network of passages 36 to keep the bearings lubricated and cooling fluid is introduced into the recess 37. The cooling fluid, incidently, is supplied and drained by other passages, not shown. The first anti-friction bearing 17 is locked in place relative to the housing 11. The second anti-friction bearings 19 at the other end is locked to the spindle 13, but is capable of moving relative to the housing 11, this movement being provided by the rollers 32. Mist lubrication is introduced to all of the bearings and, of course, heat is absorbed from the motor 33 by the cooling fluid flowing through the recess 37. Despite every attempt to maintain the temperatures in the housing at a constant level by use of the cooling fluid, etc., nevertheless, as work is accomplished by the tool 14 and as the motor 33 is energized at various times and then shut down, the temperatures have a tendency to vary.

The increase and decrease of temperature causes the spindle 13 to expand and contract, respectively. As it does so, it carries the bearings 19 with it which in turn carries the sleeve 24, which it will be recalled, is fixed to the outer race 21 of the bearing. As the sleeve 24 slides back and forth axially with changes in temperature, this movement is permitted by the rollers 32. These rollers engage the surface of the bore 12 with point contact, since they rotate about axes which are tangential to a circle concentric with the spindle and because their generatrices have a radius which is less than the radius of the bore 12. They also engage the outer surface 26 of the sleeve 24 with point contact. Because the generatrices of the roller 32 have a radius which is only slightly smaller than that of the bore 12, the area of contact is, as a practical matter, fairly substantial. That is to say, even though the contact is theoretically point contact, nevertheless, as a practical matter, due to deflection of metals and etc., the area of contact is the amount which is necessary to absorb forces. These rollers, therefore, are capable of absorbing very large forces to which the spindle 13 is subjected. This means that the radial support for the spindle 13 is very stiff, i.e., a given amount of force produces a small deflection or movement of the spindle in its bearings, etc. This means that large forces can be applied to the tool 14 without substantial deflection of the spindle. At the same time, the prestress which is applied to the two bearings 17 and 19, remains exactly the same, because expansion or contraction of the spindle will not alter prestress in the bearing, as was the case in the prior art.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by letters patent is:

1. A toolhead comprising
   a. a housing having a bore extending therethrough,
   b. a spindle rotatably mounted in the bore and extending therefrom,
   c. a first anti-friction bearing at one end of the spindle between the spindle and the bore, the bearing having an outer race fixed in the bore, an inner race fixed on the spindle, and rolling elements therebetween, d. a second anti-friction bearing at the other end of the spindle between the spindle and the bore, the bearing having an outer race, an inner race, and rolling elements therebetween, e. a sleeve mounted in the bore for sliding movement in the axial direction, the outer race of the second anti-friction bearing being fixed in the sleeve and the corresponding inner race being fixed to the spindle, and f. two axially-spaced rows of rolling elements residing between the sleeve and the bore to allow the said sliding movement, each row consisting of a plurality of rolling elements in the form of barrel-shaped rollers, the axis of each roller being tangential to a circle concentric with the spindle.

2. A toolhead as recited in claim 1, wherein a retainer is located between the bore and the outer surface of the sleeve to hold the rollers in place, the retainer consisting of a thin-walled tube having generally rectangular perforations.

3. A toolhead as recited in claim 2, wherein the generatrices of the surface of each roller is an arc of a circle, the radius of curvature being substantially less than that of the bore.

4. A toolhead as recited in claim 3, wherein the retainer consists of a central tubular member whose ends are provided with notches and of two end rings that are fastened over the ends of the central tubular members, the notches and the rings defining the said apertures.

5. A toolhead as recited in claim 4, wherein the notch consists of two parallel side surfaces extending axially inwardly from the end of the tubular member and a bottom surface joining the side surfaces, the bottom surface having substantially the same shape as the surface of a roller.

* * * * *